United States Patent Office 3,110,198
Patented Nov. 12, 1963

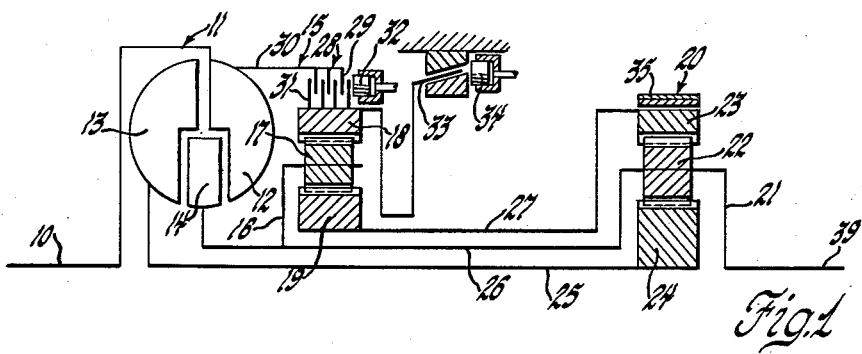

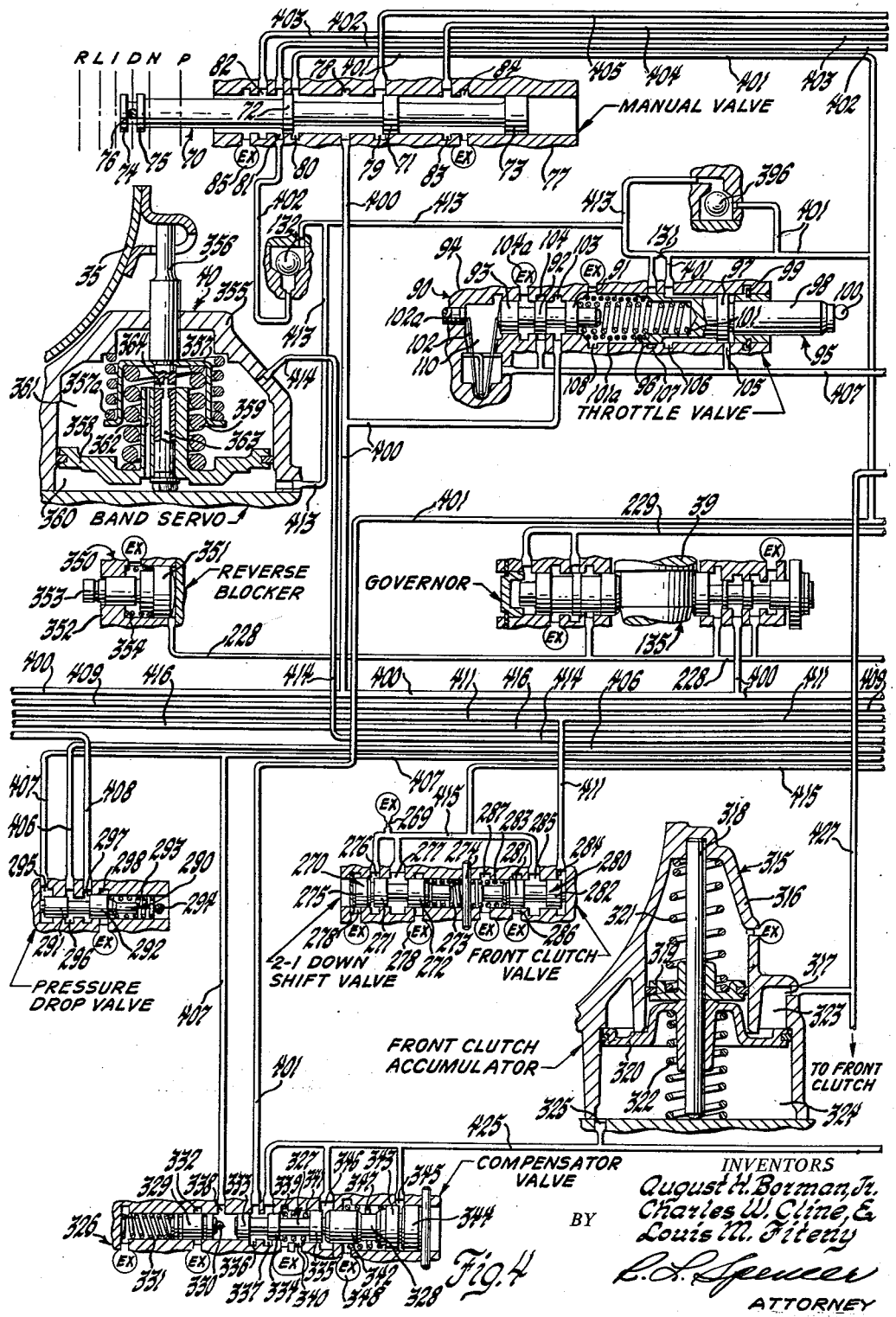

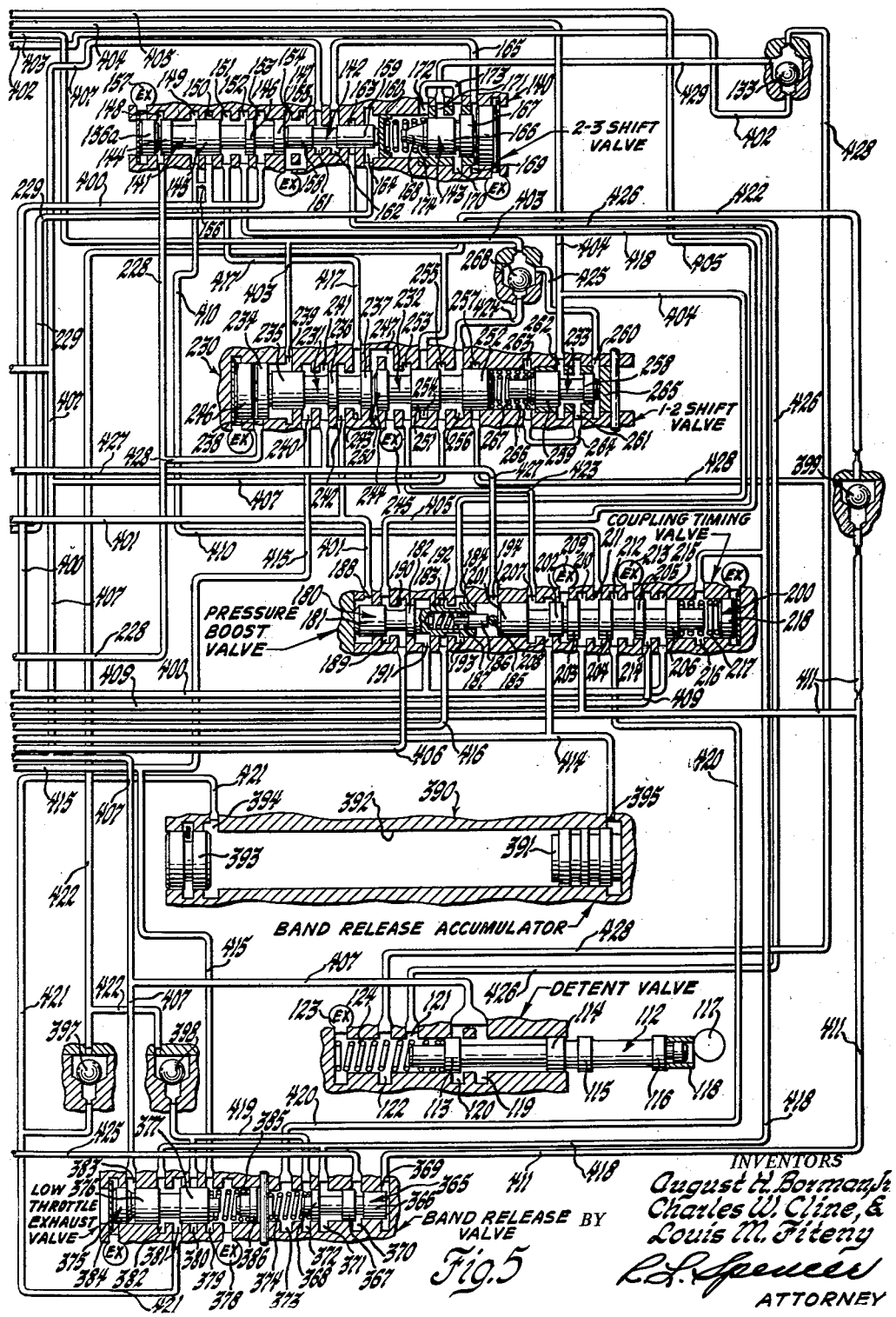

3,110,198
TRANSMISSION CONTROL SYSTEM
August H. Borman, Jr., Detroit, Charles W. Cline, Livonia, and Louis M. Fiteny, Allen Park, Mich., assignors to General Motors Corporation, Detroit, Mich., a corporation of Delaware
Filed Sept. 20, 1960, Ser. No. 57,321
18 Claims. (Cl. 74—688)

This invention relates to transmissions, and more particularly to a control system for controlling the drive ratio of a transmission of the step ratio type.

An object of this invention to provide a control system for controlling the drive ratio of a step ratio transmission particularly adapted to accomplish change of drive ratio smoothly and with minimum torque reaction bumps.

Another object of this invention is to provide in a step ratio transmission having a fluid pressure applied and fluid pressure released brake, a control system for varying the timing of release of the brake.

A further object of this invention is to provide in a transmission having a fluid pressure released brake an accumulator for controlling release of the brake and accumulator control valving for controlling the action of the accumulator.

An additional object of this invention is to provide in a transmission having a brake adapted to be released by fluid pressure an accumulator for controlling release of the brake having a freely movable piston and control valving for controlling the stroke of the piston to vary the timing of release of the brake.

Another object is to provide in a transmission having a brake adapted to be released by fluid pressure and a hydrodynamic torque transmitting unit adapted to be filled with fluid, means for controlling the timing of release of the brake including an accumulator and a pair of accumulator control valves wherein one of the control valves is controlled manually and the other of said control valves is controlled both manually and by pressure in the hydrodynamic torque transmitting unit.

These and other objects and advantages of this invention will be apparent from the following description and claims, taken in conjunction with the accompanying drawings in which:

FIGURE 1 is a schematic drawing of a transmission adapted to use the control system constituting this invention.

FIGURE 2 is a block diagram illustrating proper assembled relationship of FIGURES 3, 4 and 5.

FIGURE 3 is a schematic diagram of a pump and a portion of the control valving incorporated in the transmission control system.

FIGURE 4 is a schematic diagram of a second portion of the control system including control valving, a band servo and a front clutch accumulator.

FIGURE 5 is a schematic diagram of the remainder of the control system including control valving and a band release accumulator.

Referring to FIGURE 1, the transmission, illustrated schematically, has an engine driven power input shaft 10 connected to drive an impeller 12 of a twin turbine hydrodynamic torque transfer device 11 which may be termed a hydraulic coupling having turbines 13 and 14. A front planetary gear unit 15 includes a planet carrier 16 supporting a plurality of pinion gears 17 in mesh with a ring gear 18 and a sun gear 19. A rear gear unit 20 consists of a planet carrier 21 supporting a plurality of planet pinions 22 in mesh with a ring gear 23 and a sun gear 24. First turbine 13 is directly connected to sun gear 24 by a shaft 25. Second turbine 14 is directly connected to the planet carriers 16 and 21 by means of a hollow sleeve shaft 26. Planet carrier 21 is directly connected to an output shaft 39 and turbine 14, carrier 16, carrier 21, and output shaft 39 all rotate as a unit. As hereafter more fully explained, turbine 14 in low or first gear drive causes the coupling 11 to function as a torque converter capable of multiplying torque. In second and third gear drive ratios, the hydrodynamic device 11 functions as a fluid coupling without torque multiplication. Sun gear 19 is directly connected to ring gear 23 for rotation therewith as a unit by means of a sleeve shaft 27.

A front unit clutch 28 includes a set of clutch discs 29 axially slidable on a clutch drum 30 driven by input shaft 10 and a set of clutch discs 31 slidable on ring gear 18 and rotatable with the ring gear. A piston 32 may receive fluid pressure to engage the clutch. A cone brake 33 is connected to ring gear 18 and may be engaged by a fluid pressure responsive piston 34 for reverse drive.

A brake band 35 may be applied to ring gear 23 to brake ring gear 23 and sun gear 19 against either forward or reverse rotation, by means of a fluid pressure controlled band servo 40, best shown in FIGURE 4.

OPERATION OF GENERAL ARRANGEMENT

The transmission so far described affords neutral, three forward drive ratios, and reverse operation.

For neutral operation, clutch 28, brake 33, and band 35 are all released so that neither the front gear unit 15 nor the rear gear unit 20 has a reaction point and power cannot be transmitted to power output shaft 39. Fluid coupling 11 is of the type adapted to be alternately filled with and emptied of working fluid and is filled with working fluid in neutral condition of operation. Due to the load of the vehicle on planet carriers 16 and 21 and upon turbine 14, the carriers and turbine 14 will not rotate when the engine idles. Turbine 13 may rotate and drive sun gear 24 causing ring gear 23 and sun gear 19 to spin. Ring gear 18 will likewise spin freely.

For first gear operation, coupling 11 is filled with working fluid and brake 35 is engaged. Upon acceleration of impeller 12 by speeding up the engine, turbine 13 will initially begin to rotate sun gear 24 and brake band 35 will prevent rotation of ring gear 23. At this initial condition of operation, which may be termed "stall," the planet carrier 21 and turbine 14, will either be held against rotation or rotate slowly forwardly due to the load of the vehicle applied to carrier 21 from shaft 39. Turbine 14 will therefore re-direct fluid discharged from turbine 14 into impeller 12 such that the fluid entering impeller 12 tends to drive the impeller. Thus, at stall, the unit 11 functions as a hydrodynamic torque converter to multiply engine torque. Shaft 39 is driven at the torque multiplication of unit 11 and the torque multiplication of gear unit 20. As the output shaft 39 speeds up, turbine 14 also speeds up and the torque multiplication through the unit 11 diminishes with increase in speed of rotation of turbine 14 while the torque multiplication of gear unit 20 remains constant. Unit 11 may reach a condition of operation wherein minimum torque multiplication is provided by unit 11 in first gear drive, but the torque multiplication of unit 11 will never drop to zero. Since turbine 14 can never attain the speed of rotation of impeller 12 in first gear drive, turbine 14 will act as a forwardly rotating reaction member in first gear drive.

For second speed drive coupling unit 11 is emptied of working fluid, front clutch 28 is engaged and brake band 35 is applied. Ring gear 18 is driven at engine speed while brake band 35 prevents rotation of sun gear 19 and ring gear 23 either forwardly or in reverse. Planet carrier 16 of front gear unit 15 drives output shaft 39 at the reduction ratio of front gear unit 15. Since coupling 11 is empty, there is no power input to rear gear unit 20. In second speed drive ratio no hydrodynamic losses occur since the drive is entirely mechanical.

For direct drive, or third gear drive ratio, front clutch 28 is engaged, brake 35 is released, and coupling 11 is filled with fluid. Drive is transmitted through clutch 28 to ring gear 18, through turbine 13 to sun gear 24, and through turbine 14 to planet carriers 16 and 21. At this time turbines 13 and 14 will rotate at substantially the speed of rotation of impeller 12. It will be apparent therefore that ring gear 18 and planet carrier 16 of the front gear unit 15 will each be driven substantially at engine speed and that the front gear unit will be locked up in direct drive. Also, since sun gear 24 and planet carrier 21 of the rear gear unit 20 are each driven substantially at engine speed, the rear gear unit 20 will be locked up in direct drive.

To obtain reverse operation, coupling 11 is filled with fluid and reverse cone brake 33 is engaged. Ring gear 18 of front gear unit 15 is held against rotation. Turbine 13 drives sun gear 24 forwardly in the direction of rotation of impeller 12. Due to the vehicle load on planet carriers 21 and 16, the carriers tend to remain stationary. Ring gear 23 and sun gear 19 therefore rotate reversely since brake 35 is released. As a consequence, this backward rotation of sun gear 19 will cause carrier 16 to rotate backwards at reduced speed. Turbine 14 also imparts reverse rotation to shaft 26. Load shaft 39 will therefore be driven in reduction drive through gear unit 15 and will have additional reverse torque applied thereto by turbine 14.

CONTROL SYSTEM

The various clutches, brakes, and the coupling unit 11 are all operated in the proper sequence by the hydraulic control system shown schematically in the drawings. Each drive establishing device or servo may be of known construction employing a piston which by fluid pressure supplied to the servo is moved to its engaged position.

Fluid pressure for the control system is supplied by a pump 50, shown in FIGURE 3, of the variable capacity type similar in function and detail to that shown in the Herndon patent, U.S. Patent No. 2,875,699. Pump 50 has a slide member 51 adapted to slide up and down, as viewed, in a guideway in the pump body. The volume of fluid discharged depends upon the position of slide 51 in its guide. A spring 52 biases slide 51 to its maximum capacity position. Pump 50 is driven by power input shaft 10 so as to commence operation as soon as the engine is started. Fluid is drawn from a suction passage 53 and discharged to a main supply passage 400.

Pressure Regulator Valve

For controlling the pressure discharged by pump 50 into main supply line 400, a pressure regulator valve 55 is slidable in a bore in a valve body and is furnished with pressure fluid from main supply line 400. Valve 55 is provided with a plurality of spaced lands 56, 57, 58, 59 and 60 and is biased upwardly by a spring 61 towards its maximum against the pressure of fluid delivered by passage 400 to the top end of valve 55. A passage 62 extends from the upper end of valve 55 through the center thereof and communicates with a cross passage 63 in the valve between lands 58 and 59. In the position shown, pressure fluid from passage 400 acting on the upper face of land 56 will urge valve 55 downwardly against spring 61 and will be transferred by passages 62 and 63 to a passage 64 which communicates with the bottom slide 51. A passage 65 communicating with the top of slide 51 is blocked off by land 59. The pressure fluid at the bottom of slide 51 plus spring 61 urge slide 51 upwardly towards its maximum capacity position. As the fluid pressure in passage 400 increases, valve 55 will move downwardly so that land 58 will permit flow of fluid from passage 64 to exhaust port 67 and to align passage 63 with passage 65. Pressure acting on the top of slide 51 will urge it downwardly to reduce the volume of the pump output. Spring 61 is effective to cause valve 55 to maintain a pressure of 90 pounds in passage 400.

In the foregoing manner, pressure regulator valve 55 will reciprocate between the above-mentioned positions so as to supply fluid pressure either to the bottom side of the slide 51 through passage 64 or the top side of slide 51 through passage 65. Consequently, slide 51 will be positioned so that the volume of fluid pumped is sufficient to produce the pressure determined by the action of pressure regulator valve 55.

MANUAL VALVE

Main pressure supply passage 400 extends to a manually operated drive range selector valve 70 shown in FIGURE 4, having spaced lands 71, 72, and 73. A pair of flanges 74 and 75 are provided for receiving an actuating pin 76 which may be actuated by suitable linkage (not shown) operable by the vehicle driver to position valve 70 to select Park, Neutral, Drive Range, Intermediate Range, Low Range, or Reverse conditions of operation. Valve body 77 is provided with ports 78, 79, 80, 81, 82, 83, 84 and 85. Ports 84 and 85 are exhaust ports and the remainder of the ports connect to fluid passages as hereafter more fully explained.

THROTTLE VALVE

Main pressure supply passage 400 extends to a throttle valve 90 composed of lands 91, 92 and 93 slidable in a bore in a valve body 94, see FIG. 4. A second valve 95, which may be termed a part throttle valve, having spaced lands 96 and 97 is slidable in valve body 94. An extension stem 98 of valve 95 extends outwardly through a seal 99 and is adapted to be acted upon by an actuating pin 100 connected to the vehicle accelerator pedal (not shown) by a suitable linkage (not shown). The arrangement is such that stem 98 will be moved to the left into body 94 in response to depression of the accelerator pedal to increase the supply of fuel to the engine. A spring 101 seats on land 91 of valve 90 and upon land 96 of valve 95. A second spring 101a seats upon valve body 94 and land 96 of valve 95. A U-shaped calibrating screw 102 bears against the end of land 93 and against a calibrating screw 102a in the end of valve body 94. Parts 103, 104 and 104a are associated with valve 90. Port 103 connects to line pressure supply passage 400. Port 104 connects to a throttle valve pressure delivery passage 407. Port 104a is an exhaust port.

Bore 94 has ports 105, 106, 107 and 108 therein associated with part throttle valve 95. Port 105 is supplied with fluid pressure from throttle valve pressure delivery passage 407. It will be noted that land 97 is of greater diameter than stem 98. Throttle valve pressure acting on land 97 will apply a thrust to valve 95 tending to move the valve to the left to compress spring 101. Port 106 connects to a line pressure supply passage 401 controlled by manual valve 70. Port 107 connects to a band apply passage 413. Port 108 is an exhaust port.

In operation, assuming the vehicle accelerator pedal is relaxed, spring 101 will position throttle valve 90 to block off port 103 from port 104 and spring 102 will position valve 90 to connect port 104 to exhaust port 104a. Spring 101 will position valve 95 to block off port 106 from 107. As the accelerator pedal is depressed, stem 98 is moved to the left to apply a load to spring 101, thereby moving valve 90 to the left to connect port 103 to port 104 to deliver pressure to throttle valve pressure delivery passage 407. Pressure from passage 407 is admitted to a chamber 110 at the end of land 93, this pressure being effective to move valve 90 to the right to cause land 92 to block off port 104 from port 103. In the event that the accelerator pedal is relaxed, pressure in chamber 110 will move valve 90 to connect port 104 to exhaust port 104a. The pressure in passage 407 therefore varies and increases as the accelerator pedal is depressed. Throttle valve 90 is a pressure metering valve adapted to deliver a variable pressure which increases with engine torque demand.

In the initial stages of operation of valve 90, land 96 of valve 95 blocks off port 106 from port 107. However, after a certain predetermined pressure is delivered to throttle valve pressure delivery passage 407, this pressure acting on land 97 of valve 95 will move valve 95 to the left to connect port 106 to port 107 for purposes hereafter more fully explained.

DETENT VALVE

A detent valve 112 shown in FIG. 5 having lands 113, 114, 115 and 116, is acted upon by a pin 117 acting through a collar 118. Pin 118 is controlled by a suitable linkage (not shown) actuated by the vehicle accelerator pedal not shown. Five ports 119, 120, 121, 122 and 123 are associated with detent valve 112. Ports 119 and 120 connect to throttle valve pressure passage 407. Port 121 connects to a part throttle pressure delivery passage 426. Port 122 connects to a detent pressure delivery passage 428, and port 123 connects to exhaust. A spring 124 acting on land 113 normally positions detent valve 112 to block off port 120 from ports 121 and 122.

In operation, as the accelerator pedal is depressed to provide a predetermined degree of carburetor throttle valve opening, land 113 will permit flow of throttle valve pressure fluid from passage 407 to passage 426 through ports 120 and 121. At this part throttle opening of the carburetor throttle valve, the throttle valve pressure in passage 407 will be substantial, but not full line pressure. Further depression of the accelerator pedal will move valve 112 to admit pressure from passage 407 to a detent passage 428 through ports 120 and 122. At this time the throttle valve pressure supplied to passage 407 by throttle valve 90 will be full line pressure and the pressure delivered to passages 426 and 428 by detent valve 112 will likewise be full line pressure.

The control functions of the throttle valve pressure in passage 407, in passage 426 and in passage 428 will hereafter be more fully explained.

LINE PRESSURE RELIEF VALVE

Main line pressure supply passage 400 extends to a relief valve 125 shown in FIGURE 3 which comprises a ball 126 seated on a seat 127 by a spring 128, the bore of the valve having an exhaust port 129. Spring 128 seats on a pin 130 and ball 126. Valve 125 is provided as a safety feature to prevent excess pressures in the system as might occur in the event that either slide 51 of pump 50 or the pressure regulator valve 55 should become stuck in an improper position. Valve 125 also prevents excess system pressure when the oil is cold.

GOVERNOR

Main pressure supply passage 400 extends to a hydraulic governor 135 shown in FIGURE 4 arranged to be driven at speeds proportional to vehicle speed, for example, by power delivery shaft 39. Governor 135 may be of the type shown in the Borman et al. patent, U.S. Patent No. 3,048,055. Governor 135 develops two stages of pressure determined by the speed at which the governor is rotated. A first stage termed G-1 pressure is delivered to a passage 228 and a second stage termed G-2 pressure is delivered to a passage 229. These two stages are developed simultaneously, the G-2 pressure being developed at a different rate than G-1 pressure. Both G-1 and G-2 pressure vary with vehicle speed. Since the operation of the governor is fully described in the above referred to Borman application, further detailed description is deemed unnecessary herein. The G-1 pressure in passage 228 and G-2 pressure in passage 229 are used for control purposes as hereafter more fully explained.

2-3 SHIFT VALVE

Main line pressure supply passage 400 extends to a second to third gear shift valve assembly indicated generally at 140 in FIGURE 5 and used to control shift of drive ratio between second and third gear. Assembly 140 includes a governor valve 141, a shift valve 142 and a modulator valve 143. Governor valve 141 includes lands 144, 145, 146 and 147, and ports 148, 149, 150, 151, 152, 153, 154 and 155. A plug 156a in the end of the valve bore is connected to exhaust by exhaust port 157. Port 148 connects to G-1 governor pressure delivery passage 228 to admit G-1 governor pressure to the end of land 144. Port 149 connects to a third gear coupling feed passage 410. Port 150 connects to line pressure supply passage 400. Port 151 connects to a first gear pressure passage 417. Port 152 connects to a first and third gear pressure passage 418. Port 153 connects to line pressure supply passage 400. Ports 154 and 155 connect to exhaust. It will be noted that line pressure supply passage 400 is continuously conducted to third gear coupling feed passage 410 through a restriction 156. When valve 141 is in its downshift position restriction 156 is effective and when valve 141 is upshifted restriction 156 is by-passed through ports 150 and 149.

Shift valve 142 is provided with three spaced lands 158, 159, 160, the land 160 being of greater diameter than lands 158 and 159. Four ports 161, 162, 163 and 164 are associated with shift valve 142. Port 161 connects to throttle valve pressure supply passage 407. Port 162 connects to a shift throttle valve passage 165. Port 163 connects to part throttle pressure delivery passage 426. Port 164 connects to G-2 governor pressure delivery passage 229.

Modulation valve 143 is provided with spaced lands 166 and 167 and a stem extension 168 adapted to at certain times contact the end of land 160. Land 167 is of greater diameter than land 166. Four ports 169, 170, 171 and 172 are associated with modulator valve 143. Port 169 connects to passage 165. Ports 170 and 172 connect to a modulated throttle valve pressure passage 173. Port 171 connects to a passage 429. A spring 174 seats on land 166 and on land 160 to yieldably bias the modulator valve 143 to the left and shift valve 142 and governor valve 141 to the right or to their downshift position.

PRESSURE BOOST VALVE

Line pressure supply passage 400 extends to a pressure boost valve 180 shown in FIG. 5 having four spaced lands 181, 182, 183 and 184. Land 184 is of greater diameter than lands 181 through 183. A pin 185 forms a seat for a plug 186. A spring 187 seated on plug 186 yieldably biases valve 180 outwardly to the left. Seven ports 188, 189, 190, 191, 192, 193 and 194 are associated with valve 180. Port 188 connects to a drive pressure supply passage 401, to admit line pressure to the end of land 181. Port 189 connects to a line drop feed or pressure supply passage 405. Port 190 connects to a line drop signal passage 406. Port 191 connects to main line pressure supply passage 400. Port 192 connects to a line boost pressure delivery passage 416. Port 193 connects to a reverse pressure supply passage 404. Port 194 connects to a front clutch pressure supply passage 427. Line drop feed passage 405 will be provided with line pressure through manual valve 70 when valve 70 is positioned to select Park, Neutral, Drive Range and Reverse conditions of operation. When valve 70 is positioned to select intermediate range or low range condition of operation, passage 405 will be blocked off by land 71 of valve 70 from line pressure supply passage 400, and will be connected to exhaust through port 84 of valve 70. Line pressure from pressure supply line 400 will be admitted to drive passage 401 when valve 70 is positioned to select drive range, intermediate range or low range operation. When valve 70 is positioned for reverse operation, line pressure from passage 400 is admitted to line drop feed passage 405 and to reverse pressure supply passage 404.

Line boost passage 416 connects to a port 299 beneath a piston 300, see FIG. 3, on which spring 61 of line pressure regulator valve seats. When valve 180 is moved to the right-hand position against the action of spring 187 by line pressure admitted to the end of land 181, valve 180 admits line pressure from passage 400 to line boost pressure passage 416 through ports 191 and 192. This pressure acting on piston 300 will cause the pressure regulator valve 55 to boost the line pressure to a maximum of 164 pounds.

COUPLING TIMING VALVE

In the same bore with pressure boost valve 180 is a coupling timing valve 200 having six spaced lands 201, 202, 203, 204, 205 and 206. Ten ports 207, 208, 209, 210, 211, 212, 213, 214, 215 and 216 are associated with valve 200. Port 207 connects to a second to third gear pressure passage 423. Port 208 connects to a band release passage 414. Port 209 is an exhaust port. Port 210 connects to a coupling feed passage 411. Port 211 connects to a third gear coupling feed passage 410. Port 212 connects to third gear accumulator exhaust passage 420. Port 213 is an exhaust port. Port 214 connects to coupling signal pressure passage 409. Port 215 connects to line pressure supply passage 400. Port 216 connects to first and third gear coupling feed passage 418. A spring 217 seated on a plug 218 and on land 206 yieldably biases valve 200 to the left such that land 201 will contact pin 185. Land 202 is of lesser diameter than land 203 so that coupling feed passage 411 will be connected to exhaust port 209 when valve 200 is moved to its right-hand position wherein spring 217 is compressed.

COUPLING FEED LIMIT VALVE

Main line pressure supply passage 400 finally extends to a coupling feed limit valve 220 (see FIG. 3) having spaced lands 221 and 222 and biased to its upper position by a strong spring 223. Four ports 224, 225, 226 and 227 are associated with valve 220. Port 224 admits fluid pressure from fluid coupling signal passage 409 to the end of land 221. Port 225 connects to main line pressure supply passage 400. Port 226 connects to a coupling feed passage 412. Port 227 connects to exhaust.

In the event that fluid pressure in coupling signal passage 409 is greater than a predetermined minimum pressure, coupling feed limit valve 220 will compress spring to admit line pressure from main line pressure supply passage 400 to coupling feed passage 412. In the event that pressure in coupling signal passage 409 is less than said predetermined pressure, valve 220 will block off passage 400 from coupling feed passage 412. Valve 220 provides a fast fill of coupling 11 through passage 412 at heavy throttle opening in shifting from second to third gear drive ratio.

1–2 SHIFT VALVE

A first to second shift valve assembly 230 (see FIG. 5) includes a governor valve 231, a shift valve 232 and a modulator valve 233. Governor valve 231 includes four spaced lands 234, 235, 236 and 237, the land 234 being of greater diameter than land 235. Eight ports 238, 239, 240, 241, 242, 243, 244 and 245 are associated with governor valve 231. A plug 246 blocks off the end of the valve bore. Port 238 admits G–1 governor pressure from passage 428 to the end of land 234. Port 239 connects to low range pressure supply passage 403 adapted to be supplied with line pressure when manual valve 70 is positioned to select low range operation. Port 240 connects to a second to first gear signal passage 415. Port 241 connects to a front clutch apply passage 427. Port 242 connects to drive range pressure passage 401. Port 243 connects to a passage 417 connected to port 151 of governor valve 141. Port 244 is connected to an exhaust port 245 by a passage 247.

First to second gear shift valve 232 is provided with spaced lands 250, 251 and 252 and a series of ports 253, 254, 255, 256 and 257. Port 253 connects to second to third gear pressure passage 423. Port 254 connects to a third gear band release passage 422. Port 255 connects to throttle valve pressure delivery passage 407. Port 256 connects to a throttle valve pressure delivery passage 424. Port 257 connects to a detent line pressure delivery passage 428.

Modulator valve 233 includes lands 258 and 259, the land 259 being of greater diameter than land 258, and four ports 260, 261, 262 and 263. Port 260 connects to a pressure supply passage 425. Port 261 is connected to port 263 by a modulated pressure delivery passage 264. Port 262 connects to a reverse pressure supply passage 404. A plug 265 blocks off the end of the valve bore. A first spring 266 normally urges valves 232 and 231 to their left-hand or downshift position. A second spring 267 seated upon land 259 and land 252 normally biases modulator valve 233 to the right. A ball check valve 268 is located at the juncture of throttle valve pressure delivery passage 424, low range pressure supply passage 403, and passage 425. With manual valve 70 positioned for low range operation, line pressure from passage 403 will flow past ball check valve 268 to passage 425. With the manual valve positioned for any other drive range condition of operation, passage 403 will be connected to exhaust. With manual valve 70 positioned for any other drive range condition of operation other than low range, and with shift valve 232 in its downshift position, throttle valve pressure from passage 407 will flow through ports 255 and 256 of valve 232 to passage 424, past ball check valve 268 to passage 425. Ball check valve 268 will then block off passage 403 to permit exhaust of throttle valve pressure through the manual valve 70.

Throttle valve pressure acting on the end of land 258 will move modulator valve 233 to the left, compressing spring 267 and permit a modulated throttle valve pressure to enter the chamber containing spring 267 between valves 232 and 233. This modulated pressure will flow through passage 264 to the spring chamber. Due to the action of spring 267 the pressure in the spring chamber will be proportional to but less than the throttle valve pressure in passage 425. This modulated pressure acting on the end of land 252 tends to maintain the shift valve 232 and governor valve 231 in their left-hand or downshift position.

2–1 DOWNSHIFT VALVE

It will be noted that front clutch pressure apply passage 427 is connected to exhaust by a second to first gear signal passage 415 when governor valve 231 is in its downshift position. Front clutch apply passage 427 will be connected to second to first gear signal passage 415 by way of ports 241 and 240 of the first to second gear shift valve when the assembly is downshifted. Passage 415 is continuously connected to exhaust through a fixed restriction 269 (see FIG. 4). A second to first downshift valve 270 shown in FIG. 4 has spaced lands 271 and 272, the valve being biased to its left-hand position by a spring 273 seated upon a pin 274 and the end of land 272. A plug 275 blocks off the end of the valve bore. Three ports 276, 277 and 278 are associated with valve 270. Ports 276 and 277 connect to passage 415. Port 278 is an exhaust port. Valve 270 is effective during a second to first gear forced downshift to provide a means for initial rapid reduction of clutch pressure. When the pressure in signal passage 415 is greater than a predetermined pressure, for example 35 pounds, pressure entering port 276 will move valve 270 to the right against spring 273 to connect port 277 to exhaust port 278. When the pressure in passage 415 drops to 35 pounds, spring 273 will position land 272 to block off port 278 from port 277.

FRONT CLUTCH EXHAUST VALVE

Positioned in the same bore with second to first gear downshift valve 270 is a front clutch exhaust valve 280 having lands 281 and 282 and biased to its right-hand position by a spring 283 seated upon pin 274 and land 281. Four ports 284, 285, 286 and 287 are associated with valve 280. Port 284 connects to coupling feed passage 411. Port 285 connects to second to first gear signal passage 415. Ports 286 and 287 are exhaust ports. Valve 280 is controlled by coupling feed pressure to connect passage 415 to exhaust when the coupling feed pressure rises to a point where the coupling is capable of transmitting full engine torque. When pressure in coupling feed passage 411 is sufficiently high, this pressure acting on the end of land 282 will move valve 280 to the left against the action of spring 283 to connect passage 415 to exhaust by way of ports 285 and 286.

Valves 270 and 280 cooperate to provide a two stage exhaust of front clutch apply passage 427 when making a forced or heavy throttle downshift from second to first gear.

PRESSURE DROP VALVE

A pressure drop valve 290 shown in FIG. 4 has spaced lands 291 and 292 and is biased to its left-hand position by a spring 293 seated upon a pin 294 and land 292. Four ports 295, 296, 297 and 298 are associated with valve 290. Port 295 admits throttle valve pressure from passage 407 to the end of the valve bore. Port 296 connects to a line drop signal passage 406. Port 297 connects to a line drop pressure passage 408, and port 298 is an exhaust port.

In operation, valve 290 delivers presure to passage 408 which varies inversely with throttle valve pressure in passage 407. When the throttle valve pressure in passage 407 is low, or zero as with closed throttle with the accelerator pedal relaxed, spring 293 will position valve 290 to connect ports 296 and 297 and block off exhaust port 298. As the throttle valve pressure in passage 407 increases in response to depression of the accelerator pedal, valve 290 will move to the right to crack open exhaust port 298 to reduce the pressure in passage 408 at full throttle opening, land 291 will block off port 296 and port 297 will connect port 298 to exhaust.

As heretofore stated, land 57 of pressure regulator valve 55 is of greater diameter than land 56. The pressure supplied to valve 55 by passage 408 enters between lands 56 and 57 and exerts a downward thrust on valve 55 against spring 61 to reduce the line pressure supplied by valve 55. When passage 408 is exhausted spring 61 will maintain a line pressure of 95 pounds. As the pressure in passage 408 increases, line pressure in passage 400 will progressively drop to a minimum of 66 pounds when the accelerator pedal is completely relaxed.

COUPLING EXHAUST VALVE

A coupling exhaust valve 305 shown in FIGURE 3 comprises a head 306 on a guide stem 307. A spring 308 yieldably biases valve 305 off of a valve seat 309 to permit the fluid coupling to be exhausted through an exhaust port 310. When fluid pressure from coupling signal passage 409 is admitted to head 306 through a port 311, valve 305 moves downwardly against spring 308 to seat upon valve seat 309 to block off exhaust port 310.

FRONT CLUTCH ACCUMULATOR

A front clutch accumulator 315 shown in FIGURE 4 is connected to the front clutch apply passage 427 by way of a port 317 in accumulator housing 316. A guide pin 318 fixed to housing 316 slidably supports pistons 319 and 320 thereon. Springs 321 and 322 yieldably bias pistons 319 and 320, respectively, into contact with each other. Pistons 319 and 320 are of different diameter and port 317 admits front clutch apply pressure to a chamber 323 between the pistons. A chamber 324 beneath piston 320 is adapted to receive a variable pressure from a compensator valve pressure delivery passage 425 through a port 325. It will be apparent that the accumulator pistons will move to compress springs 321 and 322 in response to pressure in chamber 323. Piston 319 is responsive solely to the rate of spring 321 and will stroke before piston 320 strokes. Piston 320 is responsive not only to the rate of spring 322 but also to compensator pressure admitted to chambers 324. The accumulator, which is used to control the rate of engagement of the front clutch provides a two stage action for smooth clutch engagement and due to the effect of compensator pressure in chamber 324, calibrates the clutch engagement very closely to the torque output of the engine. As hereafter more fully explained, compensator pressure delivered to chamber 324 varies closely with changes in engine developed torque so as to calibrate the clutch engagement to engine torque output. Compensator pressure is admitted to chamber 324 through a port 325.

COMPENSATOR VALVE

A compensator valve assembly 326 includes a valve 327 and a pair of plungers 328 and 329. Plunger 329 is yieldably biased against a pin 330 to block off an exhaust port 332 by a spring 331. Valve 327 is provided with spaced lands 333, 334 and 335 and with ports 336, 337, 338, 339 and 340. Port 338 admits throttle valve pressure from throttle valve pressure passage 407 to the space between land 333 and the end of plug 329. When the throttle valve pressure reaches a predetermined value, plug 329 will connect port 338 to port 332 to limit the maximum throttle valve pressure effective on the end of land 333. Port 336 connects to drive range pressure supply passage 401. Port 337 connects to compensator pressure delivery passage 425. Ports 339 and 340 connect to exhaust. A spring 341 yieldably biases valve 327 to its right-hand position wherein port 336 is connected to port 337. Plug 328 is provided with spaced lands 342 and 343, the land 343 being of greater diameter than land 342. A fixed plug 344 closes off the end of the valve bore. Compensator pressure from passage 425 is admitted to the end of land 343 through a port 345 and to the valve bore between lands 342 and 335 through a port 346. A spring 347 and compensator pressure acting on the end of land 342 oppose movement of plug 328 to the left. Port 348 is an exhaust port.

The compensator pressure in compensator pressure passage 425 is controlled by throttle valve pressure which increases with demand for engine torque but which is not proportional to actual engine delivered torque. The compensator pressure is calibrated to vary with changes in engine delivered torque and is arrived at in two stages. In the initial stage, valve 327 does the regulating and plunger 328 is of no effect. Initially, spring 341 and throttle valve pressure acting on the end of land 333 will position valve 327 to connect port 336 to port 337 to permit oil flow to compensator pressure passage 425. Pressure from passage 425 is admitted through port 346 and will act in assistance to spring 347 to move plunger 328 to the right and will act on land 335 to move valve 327 to the left. Land 335 is of greater diameter than land 333 so that valve 327 will be moved to the left to block off port 336 from port 337. Pressure in passage 425 varies as the throttle valve pressure varies but at a different rate, the pressure changes in passage 425 being calibrated to change with variation in engine delivered torque. As the pressure in passage 425 reaches a predetermined pressure, plunger 328 is moved to the left against spring 347 and applies an additional force to valve 327 tending to move valve 327 to the left to initiate the second stage action. The compensator pressure curve developed by valve 327 changes with changes in engine delivered torque as distinguished from torque demand.

In operation of the front clutch accumulator 315 when line pressure is admitted to front clutch apply passage 427, piston 319 will initially move against spring 321 as the front clutch discs come into contact. The compensator pressure in chamber 324 varies closely with changes in engine delivered torque. The pressure build up in passage 427 and acting on the front clutch is therefore calibrated to vary closely with changes in engine delivered torque to provide smooth clutch engagement and sufficient capacity to handle the torque load. At light throttle and light torque clutch engagement will be slower than at heavy engine delivered torque. It will be apparent that accumulator 315 in combination with compensator valve 327 varies the rate of clutch engagement in accordance with changes in engine delivered torque as distinguished from torque demand.

REVERSE BLOCKER

A reverse blocker 350 shown in FIG. 4 is supplied with G-1 governor pressure from governor pressure delivery passage 228. Blocker 350 comprises a piston 351 slidable in a housing 352 and is provided with plunger 353 adapted to extend out of housing 352 into the path of linkage (not shown) connected to manual valve 70 to prevent valve 70 from being placed in reverse when the vehicle speed is higher than a predetermined speed. A spring 354 acting on piston 351 opposes movement of plunger 353 out of the housing. Governor pressure acting on piston 351 will force plunger 353 outwardly for its blocking action when the vehicle speed exceeds the predetermined speed, for example eight miles per hour.

BAND SERVO

A brake band servo 40 shown in FIG. 4 is adapted to control the engagement and release of brake band 35. Servo 40 is provided with a housing 355 having an actuating rod 356 extending therethrough the rod having a spring seat 357 fixed thereto for movement therewith. A spring 357a, seated upon housing 355 and seat 357, yieldably urges rod 356 to its band release position. A piston 358 is slidably supported on rod 356, there being a spring 359 seated upon seat 357 and piston 358. A pair of fluid pressure receiving chambers 360 and 361 are disposed on opposite sides of piston 358. A restricted passage 362 through piston 358 connects chamber 360 to chamber 361. A passage 363 in rod 356 is connected to a cross passage 364 in rod 356, the passage 364 being uncovered by piston 358 when spring 359 is fully extended. Fluid pressure may be admitted to chamber 360 from band apply passage 413 to force rod 356 outwardly to engage the band. As piston 358 moves to compress spring 359, passage 364 will be blocked off by piston 358. Fluid pressure may be admitted to chamber 361 to release the band, from a band release passage 414. Restricted passages 362 and passages 363 and 364 delay the initial rate of fluid pressure build up in chamber 360 when fluid pressure is first admitted to chamber 360 to engage the band. Spring 359 additionally cushions the band engagement to reduce the shock. These features provide smooth band application by servo 40. The rod 356 may actuate suitable linkage mechanism (not shown) to engage the brake band.

BAND RELEASE VALVE

A band release timing valve 365 shown in FIG. 5 is provided with spaced lands 366, 367 and 368, and the land 366 being of smaller diameter than lands 367 and 368. Five ports 369, 370, 371, 372 and 373 are associated with valve 365. Port 369 admits pressure from coupling feed passage 411 to the end of land 366. Port 370 admits pressure from compensator pressure passage 425 to the end of land 367. Port 371 connects to a passage 418. Port 372 connects to a passage 419. Port 373 connects to a passage 420. A spring 374 yieldably biases valve 365 to its right-hand position. Valve 365 is controlled by coupling feed pressure and compensator pressure to control the action of a band release accumulator 390 as hereafter more fully explained

LOW THROTTLE EXHAUST VALVE

A low throttle exhaust valve 375 is disposed in the same bore with band release valve 365. Valve 375 includes spaced lands 376 and 377, there being six ports 378, 379, 380, 381, 382 and 383 associated with the valve. A plug 384 blocks off the end of the valve bore. A spring 385 seated upon a spring seat 386 and land 377 yieldably biases valve 375 to its left-hand position. Port 378 is an exhaust port. Port 379 connects to second to first gear signal passage 415. Port 380 connects to a passage 419. Port 381 connects to a third gear band release accumulator passage 421. Port 382 connects to passage 418. Port 383 admits throttle valve pressure from passage 407 to the end of land 376. At closed throttle, spring 385 will position valve 375 to connect second to first gear signal passage 415 to exhaust by way of ports 379 and 378, and to connect passage 421 to passage 418 by way of ports 381 and 382. At heavy throttle, throttle valve pressure will be effective to position valve 375 to connect passage 421 to passage 419 through ports 381 and 380. At heavy throttle when throttle valve pressure exceeds 25 pounds, land 377 will block off port 379 to prevent exhaust of pressure through port 378.

BAND RELEASE ACCUMULATOR

A band release accumulator 390 comprises a free piston 391 positioned for movement in a cylinder 392. A plug 393 blocks off one end of cylinder 392. Cylinder 392 is connected to passage 421 at one end of the cylinder by a port 394. Cylinder 392 is connected to a passage 414 at the opposite end of the cylinder by a port 395.

BALL CHECK VALVES

In addition to the ball check valve 268 heretofore described, the control system includes four one-way ball check valves 396, 397, 398 and 399.

Referring to FIGURE 4, a restriction 131 is disposed in drive range passage 401 at the juncture of drive range passage 401 and band apply passage 413. Restriction 131 permits continuous restricted fluid flow from drive range passage 401 to band apply passage 413. In the event that fluid is attempting to flow from passage 401 to passage 413, ball check valve 396 will be seated. In the event that fluid is attempting to flow in the opposite direction, ball check valve 396 will unseat to by-pass restriction 131.

Referring to FIGURE 5, a one-way ball check valve 397 is shown at the juncture of third gear band release passage 422 and band release accumulator passage 421. In the event that fluid tends to flow from passage 422 to passage 421, valve 397 will seat. In the event fluid tends to flow in the opposite direction, valve 397 will unseat. Ball check valve 398 will seat to prevent fluid flow from third gear band release passage 422 to passage 419 but will permit fluid flow in the opposite direction. Ball check valve 399 will seat to prevent fluid flow from third gear band release passage 422 to coupling feed passage 411, but will permit fluid flow from coupling feed passage 411 to third gear band release passage 422.

An additional one-way ball check valve 132 shown in FIGURE 4 will permit fluid flow from intermediate range pressure passage 402 to band apply passage 413 but will prevent fluid flow from band apply passage 413 to intermediate range pressure supply passage 402.

An additional two-way check valve 133 is provided. Ball check valve 133 shown in FIGURE 5 will block off detent pressure delivery passage 428 in the event that manual valve 70 is placed for intermediate range operation and permit pressure from passage 402 to flow to passage 429. In the event that passage 402 is connected to exhaust, valve 133 will block off passage 402 and connect passage 428 to passage 429.

*Operational Summary*

The operation of the hydraulic control system in conjunction with the transmission to obtain the various drive conditions will be apparent from the following explanation:

PARK AND NEUTRAL

It is contemplated that manual valve 70 must be moved to the Park or Neutral before the engine starting circuit is completed and the engine may be started. With valve 70 in Park, linkage connected to the manual valve will cause a dog, not shown, to engage locking teeth associated with load shaft 39 to positively prevent rotation thereof and thereby prevent movement of the vehicle. With the engine started, pump 50 will supply pressure to main pressure supply passage 400. The pressure in passage 400 will be determined by the action of pressure regulator valve 55 and may vary between 66 and 94 pounds as hereafter explained.

With valve 70 in either the Park or Neutral position, drive range passage 401, intermediate range passage 402 and low range passage 403 are all connected to exhaust through the right-hand end of valve 70. Reverse pressure supply passage 404 is connected to exhaust by way of exhaust port 84. Pressure from supply passage 400 is admitted to line drop feed passage 405 by way of ports 78 and 79. Passage 405 extends to port 189 of pressure boost valve 180. Spring 187 positions valve 180 to admit line pressure from passage 405 to a line drop signal passage 406 through ports 189 and 190 of valve 180. Passage 406 extends to port 296 of pressure drop valve 290. Passage 400 supplies line pressure to port 103 of throttle valve 90 and this valve delivers variable pressure as heretofore explained to throttle valve pressure delivery passage 407. Throttle valve pressure from passage 407 is admitted to the end of land 291 of pressure drop valve 290 through port 295 to control the action of pressure drop valve 290. At closed throttle with relaxed acceleration pedal, no throttle valve pressure will exist in passage 407, and spring 293 will position valve 290 to admit full line pressure from line drop signal passage 406 to line drop feed passage 408. This pressure acting on land 57 of pressure regulator valve 55 will force valve 55 against spring 61 to its minimum pressure position wherein the valve 55 maintains a line pressure of 66 pounds. As the accelerator pedal is depressed, throttle valve pressure in passage 407 increases, moving valve 290 to the right against spring 293. Valve 290 thereupon regulates the pressure delivered to passage 408 so that the pressure in passage 408 diminishes with increase of throttle valve pressure in passage 407. At full throttle, valve 290 will block off port 296 and connect passage 408 to exhaust port 298 to permit normal full action of spring 61. Pressure in passage 400 will rise to 95 pounds. The action of pressure drop valve 290 is progressive so that the pressure maintained in passage 400 by valve 55 may vary with throttle opening between a minimum of 66 and a maximum of 95 pounds. This action reduces pump noise and at the same time permits the charge pressure to the hydraulic coupling to increase as the throttle is opened.

In park and neutral, coupling 11 is charged with fluid. Line pressure is supplied by main line pressure passage 400 to port 215 of coupling timing valve 200. Spring 217 positions valve 200 to admit line pressure from passage 400 to coupling signal passage 409 through ports 215 and 214. This pressure acting on head 306 of valve 305 positions coupling exhaust valve 305 to block off exhaust port 310. Coupling signal passage 409 also extends to port 224 of coupling feed limit valve 220. Line pressure acting on the end of land 221 of valve 220 tends to move valve 220 to connect passage 400 to a branch 412 of a coupling feed passage 411. However, pressure in passage 409 is not sufficient to cause this action and valve 220 blocks off passage 400 from passage 412. Passage 400 extends to port 150 of valve 141 of the second to third gear shift valve assembly. With valve 141 in its downshift position pressure is admitted from passage 400 to a passage 410 through a restriction 156, the passage 410 leading to port 211 of coupling timing valve 200. Spring 217 positions valve 200 to admit line pressure to passage 411 through ports 211 and 210, the passage 411 supplying oil to fill the coupling. It will be noted that line pressure supply passage 400 is continuously connected to coupling feed passage 410 through restriction 156. However, upon an upshift from second to third gear drive ratio valve 141 will connect passage 410 to passage 400 through parts 150 and 149 to by-pass restriction 156. Thus, at light throttle opening in park and neutral, the initial supply of fluid to coupling 11 is restricted for smooth coupling action.

At heavy throttle opening it is desirable to fill coupling 11 rapidly. At heavy throttle opening coupling signal pressure in passage 409, acting on land 221 of valve 220, will move coupling feed limit valve 220 to admit line pressure from passage 400 to coupling feed branch passage 412 by way of ports 225 and 226 for rapid fill of coupling 11. This action occurs whenever the coupling is being filled with working fluid. Valve 220 is effective at heavy throttle in park, neutral, first or third gear to by-pass restriction 156 for rapid coupling fill. In a shift to third gear, valve 141 will by-pass restriction 156.

Coupling feed passage 411 extends to a ball check valve 399 and to port 369 of band release valve 365 for purposes hereafter explained.

In park and neutral, band apply passage 413 is connected to exhaust through drive range pressure passage 401 and through ports 80 and 85 of valve 70. Ball check valve 396 permits oil flowing from passage 413 to passage 401 to by-pass restriction 131 for rapid exhaust of fluid from chamber 360 of band servo 40. Front clutch apply passage 427 is connected to a second to first gear signal passage 415 through ports 241 and 240 of first to second governor valve 231. Passage 415 connects to port 285 of front clutch exhaust valve 280, to ports 277 and 276 of second to first downshift valve 270, and to port 379 of low throttle exhaust valve 375. With coupling 11 filled with fluid, coupling feed pressure from passage 411 entering port 284 of front clutch exhaust valve 280 will position valve 280 to connect passage 415 to exhaust through ports 285 and 286. With coupling 11 filled with fluid and with the front clutch piston 32 and band servo 40 connected to exhaust, the transmission is conditioned for neutral operation.

DRIVE RANGE-LOW GEAR

Manual valve 70 may be moved from neutral to drive range to make possible drive of the vehicle. Coupling 11 will remain charged with fluid in the manner heretofore described. With valve 70 positioned for drive range operation, line pressure from passage 400 is admitted to a drive passage 401 through ports 78 and 80 of valve 70. Drive oil from passage 401 enters port 188 of pressure boost valve 180 moving valve 180 to the right against spring 187. Valve 180 admits line pressure from passage 400 to line drop signal passage 406 through ports 191 and 190 and to line boost passage 416 through ports 191 and 192. Pressure entering port 299 of pressure regulator valve 55 acting on piston 300 will boost the strength of spring 61 to raise the line pressure to a maximum of 164 pounds. As heretofore explained, pressure drop valve 290, controlled by throttle valve pressure, delivers variable pressure to line drop passage 408. At closed throttle the pressure maintained by valve 55 in first gear operation will be 115 pounds. As the throttle is opened, line pressure will rise to a maximum of 164 pounds.

The line pressure boost provided in first gear drive over that prevailing in neutral operation is to provide adequate holding capacity of band servo 40 to prevent slippage of the band and to accomplish fast coupling feed. The high line pressure acting on land 221 of coupling feed limit valve 220 will move valve 220 to admit pressure from passage 400 to coupling feed passage 412 through ports 225 and 226. This action by-passes restriction 156 to insure fast unrestricted coupling feed. With coupling 11 filled with fluid, pressure must be supplied to chamber 360 of band servo 40 to engage band 35 to establish first or low gear drive. Drive range pressure supply passage 401 is connected to band apply passage 413 through restriction 131 to smooth the engagement of the band. Part throttle valve 95 at light throttle opening will block off port 106 from port 107. At partially advanced throttle, valve 95 will connect port 106 to 107 to by-pass restriction 131 to admit pressure from passage 401 to band apply passage 413 to more quickly engage the band. This prevents undue band wear as might otherwise occur due to slippage during band engagement at advanced throttle positions. Ball check valve 396 will prevent flow of fluid from passage 401 to passage 413 through the ball check valve.

With coupling 11 filled with fluid and band 35 engaged, the transmission will be conditioned for first gear forward drive.

It will be noted that drive oil from passage 401 is admitted to a first gear passage 417 through ports 242 and 243 of first to second governor valve 231 when the valve is in its first gear or downshift position. Passage 417 is connected to a passage 418 through ports 151 and 152 of second to third gear governor valve 141 when valve 141 is in its downshift position. Passage 418 extends to port 216 of coupling timing valve 200 and to port 382 of low throttle exhaust valve 375. Pressure entering port 216 of valve 200 will assist spring 217 to maintain the coupling timing valve in its left-hand position. Pressure from passage 418 is also conducted to port 371 of Band release valve 365. Band release valve 365 will initially block off port 371 from port 372 to prevent flow of fluid from passage 418 to passage 419 and will connect passage 419 to passage 420 connected to port 212 of coupling timing valve 200, at light throttle opening wherein compensator pressure acting on land 367 of valve 365 is low. Passage 420 will be connected to exhaust through ports 212 and 213 of coupling timing valve 200. The connection from passage 419 to passage 420 is through ports 372 and 373 of band release valve 365. Also at light throttle opening, spring 385 will be effective to position low throttle exhaust valve 375 to connect passage 418 to passage 421 through ports 382 and 381. Passage 421 admits oil to the left-hand side of free piston 391 through port 394 causing the piston to assume its right-hand position. At heavy throttle opening compensator pressure acting on land 367 of band release valve 365 plus coupling feed pressure acting upon land 366 of valve 365 will cause valve 365 to move to its left-hand position, compressing spring 374 and connecting passage 418 to passage 419 through ports 371 and 372 and blocking off port 372 from port 373. Pressure in passage 419 will flow through ball check valve 398 to a passage 422. Ball check valve 397 will close to prevent oil flow from passage 422 to passage 421 and ball check valve 399 will close to prevent oil flow from passage 422 to passage 411. At heavy advanced throttle, throttle valve pressure acting on low throttle exhaust valve 375 will position valve 375 to connect passage 419 to passage 421 through ports 380 and 381 of valve 375. Pressure from passage 422 is blocked off from a passage 423 by land 251 of first to second shift valve 232 when valve 232 is in its downshift position. It will be noted that in first gear drive, throttle valve pressure from passage 407 will be admitted through ports 255 and 256 of shift valve 232 to a passage 424, through ball check valve 268 to a passage 425. Valve 268 will block off passage 403 from passages 424 and 425. Pressure from passage 425 will position modulator valve 233 to admit modulated throttle valve pressure to the chamber containing springs 266 and 267 through port 261, passage 264 and port 263. The throttle valve pressure acting on valve 233 will cause the valve to compress spring 267 to tend to retain shift valve 232 in its downshift position. Modulated throttle valve pressure acting on land 252 of shift valve 232 and the force of spring 266 will also tend to maintain the shift valve in its downshift position. At some vehicle speed depending on which speed, governor pressure from governor pressure delivery passage 228 acting upon land 234 of governor valve 231 will cause the governor valve 231 and shift valve 232 to upshift to establish second gear drive.

DRIVE RANGE—SECOND GEAR

With first to second shift valve 232 and governor valve 231 moved to their upshift position to establish second gear drive, coupling 11 will be emptied and front clutch piston 32 is pressurized to establish drive in second gear. Brake band 35 remains engaged. With valve 232 in its upshift position, passage 424 is connected to exhaust through ports 256 and 257 of valve 232, a passage 428, and ports 122 and 123 of detent valve 112. Drop in pressure in passage 424 permits ball check valve 268 to seat and connect passage 425 to exhaust through passage 403 and ports 82 and 85 of valve 70. Passage 417 is connected to exhaust through ports 243 and 244, passage 247, and port 245. Passage 418 will be exhausted through passage 417 to relieve the pressure acting on the end of land 206 of coupling timing valve 200. Line pressure from drive passage 401 is admitted to front clutch apply passage 427 through ports 242 and 241 of valve 231 to engage the front gear unit clutch. Front clutch apply pressure in passage 427 is admitted through port 194 to the space between land 201 of coupling timing valve 200 and land 184 of pressure boost valve 180. Coupling timing valve 200 is forced to its right-hand position compressing spring 217 and connecting coupling signal passage 409 to exhaust through ports 214 and 213 of valve 200. Spring 308 of coupling dump valve 305 is thereupon effective to position valve 305 to connect fluid coupling 11 to exhaust through port 310 of dump valve 305. Coupling feed passage 411 is connected to exhaust through ports 210 and 209 of valve 200. Pressure boost valve 180 will be moved to its left-hand position by spring 187 and pressure acting on the end of land 184 and will connect line pressure boost passage 416 to exhaust through ports 192 and 193 of valve 180, reverse pressure supply passage 404 and ports 83 and 84 of valve 70. Valve 180 will also connect line drop feed passage 405 to line drop signal passage 406 through ports 189 and 190. Pressure drop valve 290 will thereupon be effective to vary the line pressure in passage 400 between 95 and 66 pounds, depending on throttle opening.

In second gear drive, band 35 remains engaged. Fluid pressure from drive passage 401 is supplied to band apply passage 413 through restriction 131. Band release passage 414 is connected to exhaust through ports 208 and 209 of coupling timing valve 200.

DRIVE RANGE—THIRD GEAR

With the vehicle accelerated in second gear, G–1 governor pressure from passage 228 entering port 148 of valve 141 acting on the end of land 144 of valve 141 plus G–2 governor pressure from passage 229 entering port 164 of valve 142 and atcing upon land 160 of valve 142 will at some vehicle speed, depending upon throttle opening, cause the second to third gear shift valve assembly to upshift to establish third gear or direct drive. In direct drive, coupling 11 is filled with fluid, front clutch 28 remains engaged, and band 35 is released.

With valve 141 in its upshift position, line pressure from passage 400 is admitted to passage 418 through ports 153 and 152 of valve 141. This pressure applied to the end of land 206 of coupling timing valve 200 permits spring 217 to move the coupling timing valve 200 to its left-hand position irrespective of the fact that front clutch apply pressure is acting on the end of land 201 of valve 200. Line pressure is therefore admitted from passage 400 to coupling signal passage 409 through ports 215 and 214 of valve 200 to position dump valve 305 to prevent exhaust of fluid from coupling 11. Valve 141 also admits line pressure from passage 400 to passage 410 through ports 150 and 149, the valve 141 by-passing restriction 156. Passage 410 is connected to coupling feed passage 411 through ports 211 and 210 of coupling timing valve 200. Fluid pressure from passage 411 will flow through check valve 399 to passage 422 leading to port 254 of first to second shift valve 232 and be admitted to passage 423 through ports 254 and 253 of valve 232. Pressure from passage 423 will be admitted to band release passage 414 through ports 207 and 208 of coupling timing valve 200. Band release pressure in chamber 361 of servo 40 plus the force of spring 358 will be effective to move piston 358 to release band 35 irrespective of the effect of band apply pressure in chamber 360 of servo 40.

Front clutch apply passage 427 is supplied with fluid through ports 245 and 241 of first to second governor valve 231 to engage clutch 28.

With coupling 11 filled with fluid, clutch 28 engaged and band 35 released, the transmission is conditional for third gear or direct drive.

TIMING OF 2-3 SHIFT

A shift from second to third gear may occur at a very light throttle opening, with the throttle further advanced to a medium throttle range, or with the throttle further opened to an advanced or heavy throttle position.

Band release accumulator 390 is provided to vary the timing of release of band 35 for different conditions of throttle opening.

Considering a light throttle shift from second to third, when second to third gear governor valve 141 upshifts, line pressure from passage 400 is admitted to passage 418 through ports 153 and 152 of valve 141. This pressure from passage 418 acting on the end of land 206 counteracts the effect of clutch apply pressure acting on land 206 of coupling timing valve 200 and permits spring 217 to move valve 200 to its left-hand position. Pressure from passage 418 is also admitted to port 382 of low throttle exhaust valve 375 and to port 371 of band release valve 365.

During the interval in which coupling 11 is being filled with fluid, band release valve spring 374 will position valve 365 in its right-hand position. Compensator pressure in passage 425 acting on land 367 and coupling feed pressure in passage 411 acting on land 366 of valve 365 will be relatively low so that spring 374 may expand to position valve 365 such that land 368 blocks off port 371 and connect passage 419 to passage 420 through ports 372 and 373. Low throttle exhaust valve 375 will be placed in its left-hand position by spring 385 such that passage 418 will be connected to passage 421 through ports 382 and 381. Line pressure admitted from passage 400 to passage 418 through ports 153 and 152 of valve 141 of the second to third gear shift valve asembly will pass through passage 421 to port 394 of accumulator 390, causing piston 391 to move to its right-hand position adjacent port 395 of accumulator 390. Line pressure admitted to passage 410 by valve 141 is admitted to coupling feed passage 411 through ports 211 and 210 of valve 200. Pressure from passage 411 flows through valve 399 to passage 422, through ports 254 and 253 of valve 232 to passage 423 and through ports 207 and 208 of valve 200 to band release passage 414. Pressure in passage 414 acts on the right end of piston 391, but since pressure also is acting on the left-hand side of piston 391, the piston is unable to stroke and is of no effect. The pressure in passage 414 will rise rapidly and cause piston 358 of servo 40 to move to release band 35. There will therefore be a rapid release of band 35 at a light throttle shift from second to third.

Considering a medium throttle shift from second to third gear, throttle valve pressure acting on the end of land 376 of low throttle exhaust valve 375 will move valve 375 to its right-hand position where land 376 blocks off port 382 and passage 419 is connected to passage 421 through ports 381 and 380. During the interval in which coupling 11 is being filled with fluid, the effect of compensator pressure on land 367 and coupling feed pressure on land 366 will not be sufficient to overcome spring 374 and spring 374 will position band release valve 365 in its right-hand position wherein passage 419 is connected to passage 420 through ports 372 and 373 of valve 365. Passage 420 is connected to exhaust through ports 212 and 213 of coupling timing valve 200. Since passage 421 is connected to exhaust, band release pressure entering port 395 of accumulator 390 will cause piston 391 to stroke to the left toward port 394. This stroking of piston 391 delays pressure build up in band release passage 414 to delay release of band 35 until the coupling pressure is sufficient to render the coupling capable of carrying the load. Assuming a fixed throttle opening and consequent fixed compensator pressure, rise of coupling feed pressure in passage 411 will cause band release valve 365 to move to the left to block off port 373 from port 372 to prevent any further exhaust of fluid through passage 420. Fluid remaining in passage 421 and on the left-hand side of piston 391 will be trapped to prevent any further stroking of piston 391. Pressure in band release passage 414 will then rapidly rise to release band 35.

At heavy throttle shift from second to third gear the action is the same as at medium throttle shift except for the timing of movement of band release valve 365 to its left-hand position wherein land 368 blocks off port 372 from port 373 to prevent further exhaust of fluid from passage 421. With a heavy throttle opening, compensator pressure in passage 425 will be relatively high and may approach line pressure. Valve 365 will therefore shift to its left-hand position to block off exhaust passage 420 with a lower coupling feed pressure than is true at medium throttle opening. Band 35 will therefore be released sooner with a heavy throttle than at a medium throttle opening.

Line pressure maintained in passage 400 by pressure regulator valve 55 is the same as that existing in drive range second gear operation and may vary between 95 and 66 pounds.

PART THROTTLE 3-2 DOWNSHIFT

It will be noted that throttle valve pressure from passage 407 is supplied to ports 119 and 120 of detent valve 112. As the accelerator pedal, not shown, is depressed to supply fuel to the vehicle engine, valve 112 is moved to connect passage 407 to a part throttle pressure delivery passage 426 through ports 120 and 121 of valve 112. This action occurs before the accelerator pedal is fully depressed and at a time when throttle valve pressure is less than full line pressure. With the second to third speed shift valve 142 in its upshift position, pressure from passage 426 will be admitted to passage 165 through ports 163 and 162 of valve 142 and to the end of modulator valve 143 through port 169. Valve 143 will move to the left applying force to spring 174 tending to move the 2-3 shift valve to its downshift position. Also, modulated throttle valve pressure will be admitted to the chamber containing spring 174 through passage 173. This modulated pressure which is less than throttle valve pressure in passage 407 acts on land 160 tending to downshift shift valve 142. If the vehicle speed consequent G-1 and G-2 governor pressure are not too high a forced part throttle downshift from third to second gear will result.

DETENT 3-2 DOWNSHIFT

In the event that detent valve 114 is moved to its detent position by depressing the accelerator pedal for full throttle opening, valve 114 will admit pressure from passage 407 to a passage 428 through ports 120 and 122. This pressure supplied from passage 407 will be full line pressure and will be admitted through ball check valve 133 to a passage 429 connected to port 171 of modulator valve 143. Since land 167 of valve 143 is of greater diameter than land 166, valve 143 will move to right to admit line pressure from passage 428—429 to passage 173 through ports 171 and 170. This line pressure acting on the end of land 160 plus spring 174 will cause the shift valve assembly to move to its downshift or second speed position irrespective of the effect of G-1 and G-2 governor pressure tending to upshift the assembly.

PART THROTTLE 2-1 DOWNSHIFT

In the event that the vehicle is operating in second gear, a forced downshift from second to first may occur, provided the vehicle speed is not excessive. The action of throttle valve pressure tending to downshift the first to second shift valve assembly was discussed in connection with the first to second shift valve and need not be repeated here other than to state when G-1 governor pressure is not excessive, the combined effect of spring 266, spring 267, throttle valve pressure acting on land 258 of modulator valve 233 and modulated throttle valve pressure acting on land 252 will overcome the effect of G-1 pressure acting on land 234 to cause the 1-2 shift valve assembly to assume its downshift or first gear position.

In accomplishing a downshift from second to first gear it will be noted that front clutch apply pressure from passage 427 will be admitted to passage 415 through ports 241 and 240 of first to second governor valve 231 when the valve 231 assumes its downshift position. Pressure from passage 415 entering port 276 of 2-1 downshift valve 270 will move valve 70 to the right against spring 273 to connect passage 415 to exhaust through ports 277 and 278. Valve 270 regulates at a predetermined pressure, for example 30 pounds and when pressure in passage 415 is reduced to 30 pounds, spring 273 will be effective to position valve 270 to block off exhaust port 278 from port 277. This 30 pound pressure will retain the front clutch in slipping engagement during the interval in which coupling 11 is being filled with fluid. When coupling 11 is filled with fluid, coupling feed pressure in passage 411 rises and causes front clutch exhaust valve 280 to move to the left against spring 283 to connect port 285 to exhaust port 286. This completes the exhaust of the front clutch. The two stage exhaust of the front clutch on a second to first downshift prevents engine runaway during a forced downshift and provides a smooth transition of drive ratio. Front clutch pressure is also exhausted through restriction 269.

In the event of a closed throttle downshift from second to first gear, when throttle valve pressure in passage 407 is less than a predetermined amount, for example 25 pounds, spring 385 will be effective to position low throttle exhaust valve 375 in its left-hand position such that passage 415 is connected to exhaust through ports 379 and 378 of valve 375. This will provide a fast exhaust of clutch 28 at normal closed throttle downshift from second to first. However, during a forced downshift at heavy throttle, throttle valve pressure will position valve 375 to block off port 378 so that the two-stage exhaust controlled by valves 270 and 280 is obained.

INTERMEDIATE RANGE

Drive range selector valve 70 may be positioned to select intermediate range operation. When so positioned, valve 70 admits line pressure from passage 400 to intermediate range passage 402 through ports 78 and 81. Line drop feed passage 405 is connected to exhaust through ports 79 and 84. Line pressure from passage 402 flows through ball check valve 132 to band apply passage 413 to engage brake 35. Pressure in passage 413 will also unseat ball check valve 396 to permit line pressure from passage 401 to enter passage 413 through the check valve and to by-pass restriction 131. Pressure from passage 402 will flow through ball check valve 133 to passage 429 and will be delivered to the spring chamber containing spring 174 to retain the second to third shift valve assembly in its downshift or second gear position. The action is the same as that described in connection with the detent forced third to second gear downshift. Ball check valve 133 will block off passage 428 from passages 402 and 429 and connect passage 420 to passage 429.

In intermediate range operation, first to second shift valve assembly function in the same manner as that described in connection with drive range operation.

Intermediate range operation is provided to enable the operator to accomplish a closed throttle downshift from third to second gear at high vehicle speed. This is particularly useful for obtaining engine braking in descending long or steep hills, and may also be used to delay upshift from second to third gear for rapid vehicle acceleration as desired.

When operating intermediate range, first gear, the line pressure maintained in passage 400 may vary between 115 and 164 pounds in the same manner as when operating in drive range first gear. Line drop feed passage 405 is connected to exhaust, but line pressure passage 400 admits line pressure to line drop signal passage 406 through ports 191 and 190 of pressure boost valve 180 and admits pressure to line boost passage 416 through ports 191 and 192 of valve 180. In first gear operation valve 290 functions in its normal manner heretofore described.

Upon an upshift from first to second gear in intermediate range the line pressure will be maintained at a constant 95 pounds and will not vary between 66 and 95 pounds as is true when operating in drive range second gear. Front clutch pressure entering port 419 of pressure boost valve 180 moves valve 180 to its right-hand position, connecting line drop feed passage 405 to line drop signal passage 406 through ports 189 and 190. Land 183 prevents flow of fluid from passage 400 to line boost passage 416 through ports 191 and 192. Since passage 406 is connected to exhaust through passage 405 and since no pressure is admitted to passage 416, spring 61 will maintain a constant 95 pounds line pressure. Passage 416 is connected to exhaust through ports 192 and 193 and reverse passage 404. Line pressure in intermediate range third gear operation is the same as that in second gear intermediate range, or 95 pounds. Valve 180 remains in the same position in third gear as in second gear and the action is the same as in second gear intermediate range operation.

LOW RANGE OPERATION

In low range operation the low range passage 403 is supplied with line pressure through ports 78 and 82 of valve 70. This pressure will pass through ball valve 268 to passage 425 and enter modulator valve 233 through port 260. The action will be the same in low range as with a forced downshift from second to first in drive range except that full line pressure rather than throttle valve pressure is acting to maintain the shift valve assembly in its first gear position. At moderate vehicle speeds the transmission will be maintained in first gear with a closed throttle. Line pressure control in low range first gear, second gear and third gear is the same as that in intermediate range first gear, second gear and third gear, respectively.

REVERSE

With manual valve 70 positioned in reverse, line pressure from passage 400 is admitted to line drop feed passage 405 and to reverse passage 404. Drive range passage 401, intermediate range passage 402 and low range passage 403 are all connected to exhaust through port 85 of valve 70. Reverse passage 404 admits line pressure to reverse brake piston 34 to apply brake 33, to port 262 of first to second modulator valve 233, and to port 193 of pressure boost valve 180. Pressure entering port 262 of modulator valve 233 is conducted through passage 264 to the end of land 252 of shift valve 232 to hold valve 232 and valve 231 in their downshift or first gear position. Pressure from reverse passage 404 is admitted through ports 193 and 192 of pressure boost valve 180 to line boost passage 416 to cause pressure regulator valve 55 to raise the line pressure to a maximum of 115 pounds. Line pressure from line drop feed passage 405 is admitted through ports 189 and 190 of pressure boost valve 180 to line drop signal passage 406. Pressure drop valve 290 will vary the pressure delivered to line drop passage 408 inversely with throttle valve pressure acting on the end of land 291 of valve 290. At heavy throttle, the pressure in passage 408 will drop off to permit the line pressure to rise to 163 pounds. At light throttle the pressure in passage 408 will rise and cause the pressure regulator valve 55 to drop the line pressure to 115 pounds. The pressure in passage 400 in reverse are the same as in low gear drive ratio in order to provide adequate capacity of the brakes for the high torque they must resist. Fluid pressure from passage 400 is admitted through restriction 156 to passage 410 and through ports 211 and 210 of coupling timing valve 200 to coupling feed passage 411 to fill the coupling 11 with fluid. With reverse brake 33 engaged and coupling 11 filled with fluid the transmission is conditioned for reverse operation.

There has thus been provided a transmission control system wherein the line pressure is varied to different ranges of pressure in different drive ratios and one in which the coupling feed limit valve 220 is used particularly to accomplish a fast fill of coupling 11 during a heavy throttle shift from second to first gear or from second to third gear. Band release accumulator 390 is controlled in accordance with changes in throttle valve pressure to vary the time of release of the band 35 during a shift from second to third. Part throttle valve 95 will be effective at part throttle opening to by-pass restriction 131 to quickly apply the band, and effective at small throttle opening to render restriction 131 effective to delay application of band 35. Front clutch accumulator 315 is controlled by compensator pressure to vary the clutch application in accordance with changes in engine developed torque. Band release valve 365 is controlled by compensator pressure and coupling feed pressure to control the release of band 35 in accordance with changes in engine developed torque and coupling pressure.

In addition the accumulator 392 is provided with chamber 395 and a control chamber 393. First and second accumulator control valves 375 and 365 control the admission of fluid pressure to control chamber 393. In accomplishing a shift from second to third drive ratio at closed throttle, valve 375 will deliver fluid pressure to chamber 393 through ports 382 and 381 and will block off port 380. With a slightly advanced throttle, pressure in passage 407 will position valve 375 to block off port 382 and connect port 381 to port 380. Passage 421 will initially be connected to exhaust through ports 372 and 373 of accumulator control valve 365, passage 420, and ports 212 and 213 of valve 200. As pressure in unit 11 and passage 411 rises, valve 365 will admit pressure from passage 418 to passage 419 through ports 371 and 372. Compensator pressure in passage 425 acting on land 367 of valve 365 assists pressure from passage 411 to position valve 365 to deliver pressure to passage 419. Passage 419 is connected to passage 421 through ports 380 and 381 of valve 375. It will be apparent that the action of accumulator 390 is varied with throttle opening. At closed throttle, the accumulator is unable to stroke due to pressure in control chamber 393. At slight throttle opening, the accumulator will stroke until such time that valve 365 delivers pressure to chamber 393. Valve 365 is controlled by pressure in passage 411 and compensator pressure in passage 425 so that the valve will deliver pressure to chamber 393 more quickly at heavy throttle opening than is true at relatively light throttle opening.

We claim:

1. In a transmission having planetary gearing and a plurality of fluid pressure responsive drive establishing devices, said devices including a hydrodynamic torque transmitting device, a clutch and a brake, and fluid motors for actuating said clutch and brake, respectively, a fluid pressure source, control valving connected to said source and to said drive establishing devices for controlling the transmission drive ratio, said control valving being effective in a first position thereof to deliver fluid pressure to said hydrodynamic torque transfer device and to said brake motor to establish a first transmission drive ratio, means for positioning said control valving in said first position, said control valving being effective in a second position to connect said hydrodynamic torque transmitting device to exhaust and to direct fluid pressure to said clutch motor and said brake motor to engage said clutch and brake to establish a second transmission drive ratio, means for moving said control valving to said second position, a chamber in said brake motor connected to said valving and adapted to receive fluid under pressure to release said brake, said valving being effective in a third position to direct fluid to said hydrodynamic torque transmitting device to fill said device, to direct fluid to said clutch motor to engage said clutch, and to direct fluid to said brake motor chamber to release said brake, and means for moving said control valving to said third position.

2. In a transmission having planetary gearing and a plurality of fluid pressure responsive drive establishing devices including a clutch, a brake, a hydrodynamic torque transmitting unit and fluid motors for actuating said clutch and brake, respectively, a fluid pressure source, control valving connected to said source, said hydrodynamic torque transmitting unit, and said fluid motors for controlling the transmission drive ratio, said brake motor including an apply chamber adapted to receive fluid to engage said brake and a release chamber adapted to receive fluid to release said brake, said control valving being effective in a first position to deliver fluid pressure to said clutch motor and said brake motor apply chamber to establish one transmission drive ratio, means yieldably biasing said control valving to said first position, said control valving being effective in a second position to deliver fluid pressure to said clutch motor, said brake apply and release chambers and said hydrodynamic torque transmitting unit to establish a second drive ratio, said brake being released by fluid pressure supplied to said release chamber when said valving is effective to deliver fluid pressure to said clutch motor and to said hydrodynamic torque transmitting unit, and means for moving said control valving from said first to said second position.

3. In a transmission having planetary gearing and a plurality of fluid pressure responsive drive establishing devices for establishing first, second and third drive ratios including a clutch, a brake and a hydrodynamic torque transmitting unit and fluid motors are actuating said clutch and brake, respectively, a fluid pressure source control valving connected to said source, said hydrodynamic torque transmitting unit and said fluid motors for controlling the transmission drive ratio, said control valving being effective in a first position to deliver fluid pressure to said hydrodynamic torque transmitting unit and said brake motor to engage said brake to establish a first transmission drive ratio, means yieldably biasing said control valving to said first position, said control valving being effective in a second position to connect said hydrodynamic torque transmitting unit to exhaust and to deliver fluid pressure to said clutch motor and said brake motor to engage the same to establish a second drive ratio, means for moving said control valving to said second position, said control valving being effective in a third position to deliver fluid pressure to said hydrodynamic torque transmitting unit and to said clutch motor to render said unit and clutch effective to establish drive therethrough and to deliver fluid pressure to said brake motor to release said brake to establish a third transmission drive ratio, and means for positioning said control valving in said third position.

4. In a transmission having planetary gearing and a plurality of drive establishing devices including a hydrodynamic torque transmitting unit, a clutch and a brake, a fluid pressure responsive brake motor for actuating said brake, a fluid pressure responsive clutch motor for actuating said clutch, said brake motor having a first control chamber adapted to receive fluid pressure to apply said brake and a second control chamber adapted to receive fluid pressure to release said brake, a fluid pressure source, control valving connected to said source, said hydrodynamic torque transfer unit and said fluid motors for controlling the transmission drive ratio, said control valving being effective in a first condition of operation to deliver fluid to said hydrodynamic torque transfer unit and to said first control chamber of said brake motor to engage said brake to establish first gear drive, means for positioning said control valving to establish said first condition of operation, said control valving being effective in a second condition of operation to connect said hydrodynamic torque transfer unit to exhaust and to deliver fluid pressure to said clutch motor and said brake motor to engage said clutch and brake to establish second gear drive, means for positioning said control valving to establish said second condition of operation, said control valving being effective in a third condition of operation to deliver fluid pressure to said hydrodynamic torque transfer unit, to said clutch motor and to said second fluid chamber of said brake motor to establish drive through said clutch and said hydrodynamic torque transfer unit and to release said brake, and means for positioning said control valving to establish said third condition of operation.

5. In a transmission having planetary gearing and having a plurality of drive establishing devices including a hydrodynamic torque transfer unit, a clutch and a brake fluid pressure responsive motors for actuating said clutch and brake, respectively, said brake motor having a first control chamber adapted to receive fluid pressure to apply said brake and a second control chamber adapted to receive fluid pressure to release said brake, a fluid pressure source, control valving connected to said source, to said clutch motor, and to both of said chambers of said brake motor for controlling the transmission drive ratio, said control valving being effective in one condition of operation to deliver fluid pressure to said hydrodynamic torque transfer unit and to said first brake control chamber to establish drive through said hydrodynamic unit and to engage said brake, means for positioning said control valving in a first position to establish said one condition of operation, said control valving being effective in a second condition of operation to deliver fluid pressure to said clutch motor, to said first brake control chamber, and to connect said hydrodynamic torque transfer unit to exhaust to establish drive through said clutch, means for moving said control valving to a second position to establish said second condition of operation, said contrl valving being effective in a third condition of operation to deliver fluid pressure to said hydrodynamic torque transfer unit, said clutch motor and to said second brake control chamber to establish drive through said hydrodynamic torque transfer unit and said clutch, and means for moving said control valving to a third position to establish said third condition of operation.

6. In a transmission having planetary gearing and a plurality of drive establishing devices including a hydrodynamic torque transfer unit, a clutch and a brake, a clutch servo adapted to receive fluid pressure to engage said clutch, a brake servo for engaging and releasing said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo, and to both of said control chambers of said brake servo for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving to establish said one condition of operation, said control valving being effective in a second condition of operation to deliver fluid pressure to said clutch servo and said first brake control chamber and to connect said hydrodynamic torque transfer unit to exhaust to establish drive through said clutch, means for positioning said control valving to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, and manually controlled means for controlling the pressure value of fluid pressure effective in second brake control chamber to vary the release of said brake.

7. In a transmission having planetary gearing and a plurality of drive establishing devices including a hydrodynamic torque transfer unit, a clutch and a brake, a clutch servo adapted to receive fluid pressure to engage said clutch, a brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake servo control chamber to establish drive through said hydrodynamic torque transfer unit and to engage said brake, said control valving being effective in a second condition of operation to deliver fluid pressure to said clutch servo and said first brake control chamber and to connect said hydrodynamic torque transfer unit to exhaust to establish drive through said clutch, said control valving being effective in a third position to direct fluid pressure to said clutch servo, said hydrodynamic torque transfer unit and to said second brake control chamber to establish drive through said hydrodynamic torque transfer unit and said clutch, an accumulator hydraulically connected to said second brake control chamber for controlling the pressure in said chamber, manually operable valve means for varying the action of said accumulator, means for positioning said control valving in a first position to establish said one condition of operation, and means for moving said control valving to a second position and to said third position to establish said second and third condition of operation, respectively.

8. In a transmission having planetary gearing and a plurality of drive establishing devices including a hydrodynamic torque transfer unit, a clutch and a brake, a clutch servo for actuating said clutch and a brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator hydraulically connected to said second brake control chamber for controlling the pressure in said chamber, an additional valve for controlling said accumulator, and a manually operable valve for controlling the action of said additional valve.

9. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to source, to said hydrodynamic torque transfer unit, to said clutch servo, and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for positioning said control valving in a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for positioning said control valving in said third position, an accumulator having a chamber hydraulically connected to said second brake control chamber, an accumulator control chamber, and a manually controllable valve for controlling the admission of fluid pressure to and exhaust of pressure from said accumulator control chamber to vary the action of said accumulator.

10. In a transmission having planetary gearing and a plurality of drive establishing devices including a hydrodynamic torque transfer unit, a clutch and a brake, a fluid pressure responsive clutch servo for actuating said clutch, a brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for positioning said control valving in a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for positioning said control valving in said third position to establish a third transmission drive ratio, an accumulator having a chamber hydraulically connected to said second brake control chamber, an accumulator control chamber, a valve for controlling the admission of fluid pressure to and exhaust of pressure from said accumulator control chamber, said valve being effective in one position to connect said accumulator control chamber to exhaust and movable in response to fluid pressure in said hydrodynamic torque transfer unit to deliver fluid pressure to said accumulator control chamber.

11. In a transmission having planetary gearing and a plurality of drive establishing devices including a hydrodynamic torque transfer unit, a clutch and a brake, a fluid pressure responsive clutch servo for actuating said clutch and a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, said hydrodynamic torque transfer unit, said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to and exhaust of pressure from said accumulator control chamber including an accumulator control valve, means yieldably biasing said accumulator control valve to connect said accumulator control chamber to exhaust, said accumulator control valve being movable in response to fluid pressure in said hydrodynamic torque transfer unit to connect said accumulator control chamber to said fluid pressure source, and additional manually operable means for controlling said accumulator control valve.

12. In a transmission having planetary gearing and a plurality of drive establishing devices including a hydrodynamic torque transfer unit, a clutch and a brake, a fluid pressure responsive clutch servo for actuating said clutch and a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, said hydrodynamic torque transfer unit, said clutch servo, and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to and exhaust of pressure from said second accumulator control chamber including first and second valves, said first valve being effective in one operative position to direct fluid pressure to said accumulator control chamber, manually operable means for controlling the position of said first valve, said second valve being effective in one position to deliver fluid pressure to said accumulator control chamber through said first valve and effective in a second position to connect said accumulator control chamber to exhaust, and means including manually operable means for controlling the position of said second valve.

13. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to said accumulator control chamber including first and second accumulator control valves, means yieldably biasing said first accumulator control valve to a first position to connect said accumulator control chamber to said fluid pressure source and to block off said accumulator control chamber from said second accumulator control valve, manually operable means for positioning said first accumulator control valve in a second position to connect said accumulator control chamber to said second accumulator control valve, means yieldably biasing said second accumulator control valve to connect said accumulator control chamber to exhaust when said first control valve is disposed in said second position, said second accumulator control valve being movable in response to pressure in said hydrodynamic torque transfer unit to deliver pressure to said accumulator control chamber through said first accumulator control valve when said first accumulator control valve is disposed in said second position.

14. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to said accumulator control chamber including first and second accumulator control valves, means yieldably biasing said first accumulator control valve to a first position to connect said accumulator control chamber to said fluid pressure source and to block off said accumulator control chamber from said second accumulator control valve, manually operable means for positioning said first accumulator control valve in a second position to connect said accumulator control chamber to said second accumulator control valve, means yieldably biasing said second accumulator control valve to connect said accumulator control chamber to exhaust when said first control valve is disposed in said second position, said second accumulator control valve being movable in response to pressure in said hydrodynamic torque transfer unit to deliver pressure to said accumulator control chamber through said first accumulator control valve when said first accumulator control valve is disposed in said second position, and additional manually operable means for assisting the pressure in said hydrodynamic torque transmitting unit to position said second accumulator control valve to deliver fluid pressure to said accumulator control chamber.

15. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to and exhaust of pressure from said accumulator control chamber including first and second accumulator control valves, means yieldably biasing said first accumulator control valve to a first position to connect said accumulator control chamber to said fluid pressure source and to block off said accumulator control chamber from said second accumulator control valve, means including a manually controlled valve for positioning said first accumulator control valve in a second position to block off said accumulator control chamber from said fluid pressure source and to connect said accumulator control chamber to said second accumulator control valve, means yieldably biasing said second accumulator control valve to connect said accumulator control chamber to exhaust when said first accumulator control valve is in said second position, said second accumulator control valve being movable in response to rise in pressure in said hydrodynamic torque transmitting unit to a second position to deliver fluid pressure to said accumulator control chamber through said first accumulator control valve when said first accumulator control valve is in its second position.

16. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to and exhaust of pressure from said accumulator control chamber including first and second accumulator control valves, means yieldably biasing said first accumulator control valve to a first position to connect said accumulator control chamber to said fluid pressure source and to block off said accumulator control chamber from said second accumulator control valve, means including a manually controlled valve for positioning said first accumulator control valve in a second position to block off said accumulator control chamber from said fluid pressure source and to connect said accumulator control chamber to said second accumulator control valve, means yieldably biasing said second accumulator control valve to connect said accumulator control chamber to exhaust when said first accumulator control valve is in said second position, said second accumulator control valve being movable in response to rise in pressure in said hydrodynamic torque transmitting unit to a second position to deliver fluid pressure to said accumulator control chamber through said first accumulator control valve when said first accumulator control valve is in its second position, and means including a further manually controlled valve for delivering variable pressure to said second accumulator control valve, said variable pressure acting in assistance to said pressure in said hydrodynamic torque transmitting unit to position said second accumulator control valve to deliver fluid pressure to said accumulator control chamber.

17. In a transmission having planetary gearing and a plurality of drive establishing devices including a hydrodynamic torque transfer unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective in one condition of operation to deliver fluid pressure to said hydrodynamic torque transfer unit and to said first brake control chamber to establish drive through said hydrodynamic torque transfer unit and to engage said brake, means for positioning said control valving in a first position to establish said one condition of operation, said control valving being effective in a second condition of operation to deliver fluid pressure to said clutch servo and said first brake control chamber and to connect said hydrodynamic torque transfer unit to exhaust to establish drive through said clutch, means for moving said control valving to a second position to establish said second condition of operation, said control valving being effective in a third position to direct fluid pressure to said clutch servo, said hydrodynamic torque transfer unit and to said second brake control chamber to establish drive through said hydrodynamic torque transfer unit and said clutch, means for moving said control valving to said third position, an accumulator having a chamber hydraulically connected to said second brake control chamber, an accumulator control chamber, means for controlling the admission of fluid pressure to and exhaust of pressure from said accumulator control chamber including first and second accumulator control valves, means yieldably biasing said first accumulator control valve to a first position to connect said accumulator control chamber to said fluid pressure source and to block off said accumulator control chamber from said second accumulator control valve, means including a manually controlled valve for positioning said first accumulator control valve in a second position to block off said accumulator control chamber from said fluid pressure source and to connect said accumulator control chamber to said second accumulator control valve, means yieldably biasing said second accumulator control valve to connect said accumulator control chamber to exhaust when said first accumulator control valve is in said second position, said second accumulator control valve being movable in response to rise in pressure in said hydrodynamic torque transmitting unit to a second position to deliver fluid pressure to said accumulator control chamber through said first accumulator control valve when said first accumulator control valve is in its second position, and means including a further valve controlled by said manually controlled valve for delivering variable pressure to said second accumulator control valve, said variable pressure acting in assistance to said pressure in said hydrodynamic torque transfer unit to position said second accumulator control valve to deliver fluid pressure to said accumulator control chamber through said first accumulator control valve.

18. In a transmission having planetary gearing and a plurality of drive establishing devices including a hydrodynamic torque transmitting unit, a clutch and a brake, a fluid pressure responsive clutch servo for actuating said clutch, a fluid pressure responsive brake servo for actuating said brake, said brake servo having a first control chamber adapted to receive fluid pressure to apply said brake and a second control chamber adapted to receive fluid pressure to release said brake, a fluid pressure source, control valving connected to said source, to said hydrodynamic torque transfer unit, to said clutch servo and to both of said brake servo control chambers for controlling the transmission drive ratio, said control valving being effective to deliver fluid presusre to said hydrodynamic torque transmitting unit and to said first brake servo control chamber to establish a first transmission drive ratio, means positioning said control valving in a first position to establish said first drive ratio, said control valving being effective to deliver fluid pressure to said clutch servo and to said first brake control chamber and to connect said hydrodynamic torque transmitting unit to exhaust to establish a second transmission drive ratio, means for positioning said control valving in a second position to establish said second drive ratio, said control valving being effective to deliver fluid pressure to said hydrodynamic torque transmitting unit, said clutch servo and said second brake control chamber to establish a third transmission drive ratio, means for positioning said control valving in a third position to establish said third transmission drive ratio, an accumulator having a chamber connected to said second brake control chamber and having an accumulator control chamber, means for controlling the admission of fluid pressure to said accumulator control chamber including first and second accumulator control valves, means yieldably biasing said first accumulator control valve to admit fluid pressure to said accumulator control chamber, a manually operable valve for delivering variable pressure, said first accumulator control valve being movable in response to fluid pressure delivered by said manually operable valve to connect said accumulator control chamber to said second accumulator control valve, means yieldably biasing said second accumulator control valve to connect said accumulator control chamber to exhaust, said second accumulator control valve being movable in response to pressure in said hydrodynamic torque transmitting unit to direct fluid pressure to said accumulator control chamber through said first accumulator control valve, and an additional pressure metering valve controlled by the variable pressure delivered by said first pressure metering valve adapted to deliver variable pressure to said second accumulator control valve, the variable pressure delivered by said additional pressure metering valve acting in assistance to the pressure in said hydrodynamic torque transmitting unit to position said second accumulator control valve to direct fluid pressure to said accumulator control chamber.

References Cited in the file of this patent

UNITED STATES PATENTS

| | | |
|---|---|---|
| 2,893,261 | Flinn | July 7, 1959 |
| 3,048,055 | Borman et al. | Aug. 7, 1962 |